United States Patent
Yu (10) Patent No.: US 9,207,516 B1
(45) Date of Patent: Dec. 8, 2015

(54) HYBRID TUNABLE FILTER CAPABLE OF OUTPUTTING A SINGLE SPECTRAL PEAK

(71) Applicant: Mozhi Yu, San Jose, CA (US)

(72) Inventor: Mozhi Yu, San Jose, CA (US)

(73) Assignee: Mozhi Yu, San Jose, CA (US)

( * ) Notice: Subject to any disclaimer, the term of this patent is extended or adjusted under 35 U.S.C. 154(b) by 147 days.

(21) Appl. No.: 14/014,238

(22) Filed: Aug. 29, 2013

(51) Int. Cl.
*G02F 1/21* (2006.01)

(52) U.S. Cl.
CPC .................................... *G02F 1/216* (2013.01)

(58) Field of Classification Search
CPC ...................................................... G02F 1/216
See application file for complete search history.

(56) References Cited

U.S. PATENT DOCUMENTS

| 5,150,236 A | 9/1992 | Patel | |
| 5,321,539 A * | 6/1994 | Hirabayashi et al. | 349/198 |
| 5,592,314 A * | 1/1997 | Ogasawara et al. | 349/18 |
| 8,164,757 B2 | 4/2012 | Yamanoi | |
| 8,340,523 B2 | 12/2012 | Shen | |
| 8,410,871 B2 | 4/2013 | Kim | |
| 2004/0239869 A1* | 12/2004 | Cavanaugh et al. | 349/198 |
| 2005/0105565 A1* | 5/2005 | Tobiason | H01S 3/1062 372/20 |

* cited by examiner

*Primary Examiner* — Jessica M Merlin
(74) *Attorney, Agent, or Firm* — Xin Wen (57) ABSTRACT

A hybrid tunable filter includes an upper substrate comprising an upper lip and a lower substrate comprising a lower lip, a first conductive layer coated on a lower surface of the upper substrate, a second conductive layer coated on an upper surface of the lower substrate, a first high reflectivity layer formed on a portion of the first conductive layer, a first electrode layer formed on a portion of the first conductive layer under the upper lip, a second high reflectivity layer formed on a portion of the second conductive layer, a second electrode layer formed on a portion of the second conductive layer above the lower lip, and a band-pass filter layer that can pass the etalon cavity to produce an output light having a single spectral peak.

18 Claims, 10 Drawing Sheets

HYBRID TUNABLE FILTER CAPABLE OF OUTPUTTING A SINGLE SPECTRAL PEAK

BACKGROUND OF THE INVENTION

The present application relates to optical devices, specifically to tunable filters suitable for lasers and telecommunication devices.

Tunable filter is an important component in optical communications. Tunable filter is often used in a transmitter system to vary the frequency of the laser beam emitted by a modulated laser. Tunable filter is also used to implement dynamic configurations of frequency channels in a wavelength-division multiplexing (WDM) system at a routing point in an optical network. In telecommunication, tunable frequency ranges cover a C-band from 1530 nm to 1570 nm and an L-band from 1570 nm to 1610 nm.

MEMS-based tunable filter can have high resolutions, but their sensitivity to mechanical disturbances makes it impractical to be deployed in the field. Opto-acoustic tunable filter has good stability, but the narrow bandwidth in the optical communications requires long active acoustic-optical region, which makes this type of filters bulky. Moreover, the acoustic waves can generate a lot of heat in operation.

Recently, Etalon-based filter are widely used in telecommunication. Etalon is based on Fabry-Pérot cavity which produces multiple spectral peaks. In conventional Etalon-based filters, a narrow bandwidth is associated with high insertion loss. In particular, liquid crystal Etalon-based filters have large insertion losses because of the high light absorption in liquid crystal materials in the cavities.

U.S. Pat. No. 5,150,236 teaches a tunable liquid crystal Etalon filter that outputs a series of spectral peaks. The spaces between the spectral peaks can be varied by adjusting the length of Etalon cavity. The output light beam has a single transmission peak only in the short wavelength range from 1472 nm to 1528 nm, wherein the tuning stability is very poor due to sharp slope in tuning curve. Moreover, due to its high reflectivity (>95%) in the Etalon cavity, the Etalon filter disclosed in the '236 patent suffers from large insertion loss and is very sensitive to the alignment errors in the two parallel plates that define the Etalon cavity.

There is therefore a need for a tunable filter that is compact, stable, and has low insertion losses, and can produce single spectral peak in the wavelength range required by optical communications.

SUMMARY OF THE INVENTION

The present application discloses hybrid tunable Etalon filters that can output single spectral peak in the C-band and the L-band used in optical communications. The disclosed hybrid tunable Etalon filters are compact and stable, and have lower insertion loss than conventional systems. The disclosed hybrid tunable Etalon filters also provide electrodes that easy accessible to external voltage supply. The disclosed hybrid tunable Etalon filters have more tolerance to slight errors in the alignments of the parallel mirrors in the Fabry-Pérot cavity compared to conventional systems.

In one general aspect, the present invention relates to a hybrid tunable filter that includes an upper substrate comprising an upper lip; a lower substrate comprising a lower lip and being substantially parallel to the upper substrate, wherein the upper substrate and the lower substrate are offset from each other to allow the upper lip to hang over the lower substrate and the lower lip to protrude outside of the upper substrate; a first conductive layer coated on a lower surface of the upper substrate; a second conductive layer coated on an upper surface of the lower substrate; a first high reflectivity layer formed on a portion of the first conductive layer; a first electrode layer formed on a portion of the first conductive layer under the upper lip; a second high reflectivity layer formed on a portion of the second conductive layer; a second electrode layer formed on a portion of the second conductive layer above the lower lip; a spacer sandwiched between the upper substrate and the lower substrate, wherein the spacer is elongated and is arranged to form a loop having an opening and defining a gasket enclosed area; a liquid crystal material configured to fill the gasket enclosed area, wherein the first high reflectivity and the second high reflectivity layer define an etalon cavity in the gasket enclosed area which transmits light characterized by having multiple spectral peaks; and a band-pass filter layer formed on one of the upper surface of the upper substrate or the lower surface of the lower substrate, wherein the band-pass filter layer is characterized by a band-pass width BPW and can pass the light in one of multiple spectral peaks from the etalon cavity, thereby producing an output light having a single spectral peak.

Implementations of the system may include one or more of the following. The single spectral peak of the output light can be tuned within the BPW of the band-pass filter layer by an electric voltage applied across the first electrode layer and the second electrode layer. The multiple spectral peaks of the light in the etalon cavity are separated by a free spectral range FSR, wherein the etalon cavity is configured such that BPW is smaller than FSR. The etalon cavity is configured such that BPW is smaller than 0.9 FSR. The etalon cavity is configured such that BPW is larger than 0.5 FSR. The etalon cavity is configured such that BPW is larger than 0.7 FSR. The spacer can define a distance between the first high reflectivity layer and the second high reflectivity layer smaller than and 20 µm. The distance between the first high reflectivity layer and the second high reflectivity layer can be smaller than and 15 µm. The distance between the first high reflectivity layer and the second high reflectivity layer can be between 2 µm and 20 µm. The hybrid tunable filter can further include an anti-reflectivity layer formed on another one of the upper surface of the upper substrate or the lower surface of the lower substrate. The hybrid tunable filter can further include a first buffed polymer layer formed on the first high reflectivity layer; and a second buffed polymer layer formed on the second high reflectivity layer, wherein the first buffed polymer layer and the second buffed polymer layer are configured to align the liquid crystal material. The first buffed polymer layer and the second buffed polymer layer can respectively align the liquid crystal material in a same direction or opposition directions. The first buffed polymer layer and the second buffed polymer layer can respectively align the liquid crystal material in orthogonal directions. The upper substrate and the lower substrate can be substantially transparent to the output light. The loop can have an opening, and the hybrid tunable filter can further include a sealing material configured to seal the opening in the loop thereby enclosing the liquid crystal material in the gasket enclosed area.

In another general aspect, the present invention relates to a hybrid tunable filter, that includes: an upper substrate comprising an upper lip; a lower substrate comprising a lower lip and being substantially parallel to the upper substrate, wherein the upper substrate and the lower substrate are offset from each other to allow the upper lip to hang over the lower substrate and the lower lip to protrude outside of the upper substrate; a first conductive layer coated on a lower surface of the upper substrate; a second conductive layer coated on an upper surface of the lower substrate; a first high reflectivity layer formed on a portion of the first conductive layer; a first electrode layer formed on a portion of the first conductive layer under the upper lip; a second high reflectivity layer formed on a portion of the second conductive layer; a second electrode layer formed on a portion of the second conductive layer above the lower lip; a spacer sandwiched between the upper substrate and the lower substrate, wherein the spacer is elongated and is arranged to form a loop defining a gasket enclosed area; a liquid crystal material configured to fill the gasket enclosed area, wherein the first high reflectivity and the second high reflectivity layer define an etalon cavity in the gasket enclosed area which transmits light characterized by multiple spectral peaks; a long-pass edge filter layer formed on one of the upper surface of the upper substrate or the lower surface of the lower substrate; and a short-pass edge filter layer formed on another one of the upper surface of the upper substrate or the lower surface of the lower substrate, wherein the long-pass edge filter layer and the short-pass edge filter layer in combination define a band-pass width BPW, which can pass the light in one of multiple spectral peaks from the etalon cavity, thereby producing an output light having a single spectral peak.

In another general aspect, the present invention relates to a hybrid tunable filter that includes: an upper substrate comprising an upper lip; a lower substrate comprising a lower lip and being substantially parallel to the upper substrate, wherein the upper substrate and the lower substrate are offset from each other to allow the upper lip to hang over the lower substrate and the lower lip to protrude outside of the upper substrate; a first conductive layer coated on a lower surface of the upper substrate; a second conductive layer coated on an upper surface of the lower substrate; a first high reflectivity layer formed on a portion of the first conductive layer; a first electrode layer formed on a portion of the first conductive layer under the upper lip; a second high reflectivity layer formed on a portion of the second conductive layer; a second electrode layer formed on a portion of the second conductive layer above the lower lip; a spacer sandwiched between the upper substrate and the lower substrate, wherein the spacer is elongated and is arranged to form a loop having an opening and defining a gasket enclosed area; a liquid crystal material configured to fill the gasket enclosed area, wherein the first high reflectivity and the second high reflectivity layer define an etalon cavity in the gasket enclosed area which transmits light characterized by having multiple spectral peaks; and a band-pass filter characterized by a band-pass width BPW and configured to pass the light from the etalon cavity in one of multiple spectral peaks in the BPW, thereby producing an output light having a single spectral peak.

These and other aspects, their implementations and other features are described in detail in the drawings, the description and the claims.

BRIEF DESCRIPTION OF THE DRAWINGS

FIG. 7 shows the superposition of the filter spectra of the etalon cavity (e.g. FIG. 5) and the band-pass filter (e.g. FIG. 6) in the hybrid tunable filter shown in FIG. 3.

DETAILED DESCRIPTION OF THE INVENTION

Figure 1:
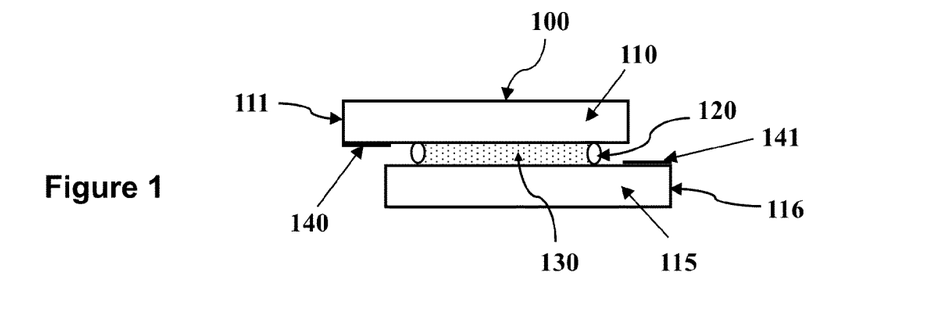
FIG. 1 is a cross-sectional view of a hybrid tunable filter in accordance with the present invention.
Figure 2:
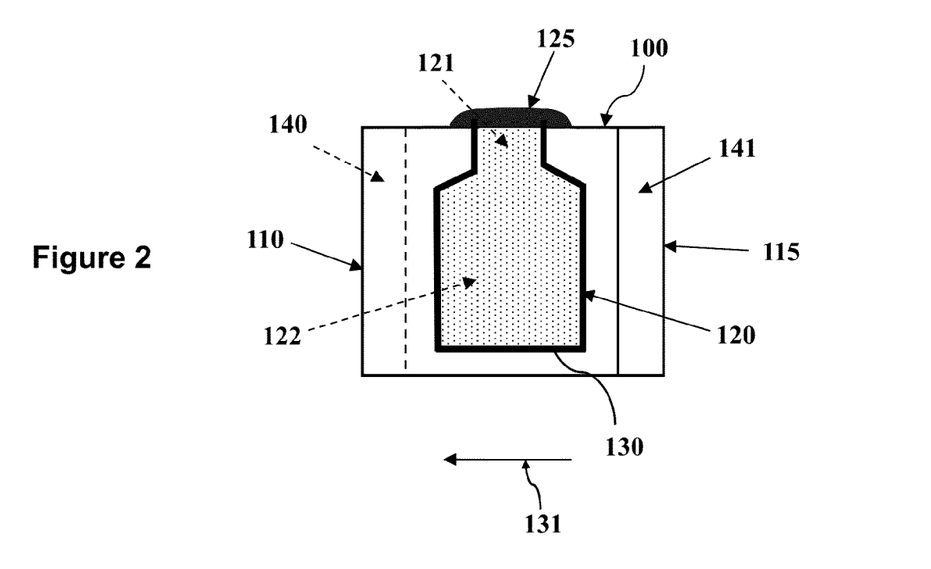
FIG. 2 is a top view of the hybrid tunable filter shown in FIG. 1.

In some embodiments, referring to FIGS. 1 and 2, a hybrid tunable filter 100 includes a pair of transparent substrates: an upper substrate 110 and a lower substrate 115. The upper substrate 110 and the lower substrate 115 are substantially parallel with each other. The substrates can for example be made of glass. An elongated spacer 120 is sandwiched between the upper substrate 110 and the lower substrate 115, which forms a loop having an opening 121 and defining a gasket enclosed area 122. The gasket enclosed area 122 is filled with a liquid crystal material 130. The opening 121 is sealed by a sealing material 125 (e.g. epoxy), which fully encloses the liquid crystal material 130. Several layers coated on the surfaces of the upper substrate 110 and the lower substrate 115 are not shown in FIGS. 1 and 2, and are described in detail below in different embodiments in relation to FIGS. 3-5.

An important aspect of the hybrid tunable filter 100 is that the upper substrate 110 and the lower substrate 115 are offset from each other: the upper substrate 110 includes an upper lip 111 that protrudes out and hangs over the lower substrate 115; the lower substrate 115 includes a lower lip 116 that protrudes outside of the substrate 110. An electrode layer 140 forms over a lower surface of the upper substrate 110 below the portion of the upper lip 111. An electrode layer 141 forms over an upper surface of the lower substrate 115 above the portion of the lower lip 116.

Figure 3:
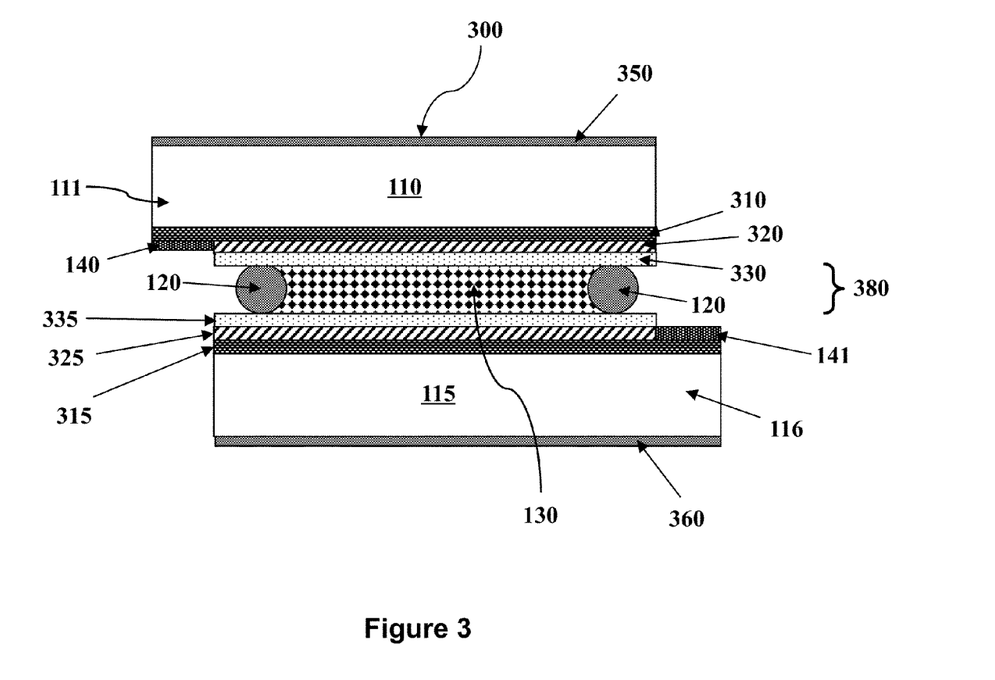
FIG. 3 is a detailed cross-sectional view of a hybrid tunable filter in accordance with an embodiment of the present invention.

In some embodiments, referring to FIG. 3, a hybrid tunable filter 300 includes an upper substrate 110 and a lower substrate 115 separated by a spacer 120, as described above. The upper substrate 110 and the lower substrate 115 are substantially parallel with each other. The spacer defines a gasket enclosed area that is filled with a liquid crystal material 130. The lower surface of the upper substrate 110 is coated with a conductive layer 310 (e.g. made of Indium Tin Oxide) on which the electrode layer 140 is formed (under the upper lip 111). The upper surface of the lower substrate 115 is coated with a conductive layer 315 (e.g. made of Indium Tin Oxide) on which the electrode layer 141 is formed (over the lower lip 116). One advantage of the presently disclosed hybrid tunable filters is that the electrode layers are easily accessible by connectors (not shown) for external voltage supplies.

High reflectivity layers 320, 325 are respectively coated on the conductive layers 310, 320, which provide mirrors for the Fabry-Pérot cavity. Buffed polymer layers 330, 335 are respectively coated on the high reflectivity layers 320, 325, which provide alignment directions for the liquid crystal material 130 at the upper and lower boundaries of an etalon cavity 380. The buffed polymer layers 330, 335 can be formed by polyimide. In one embodiment, as shown in FIG. 2, the buffed polymer layers 330, 335 can be polished in the direction 131 to align the liquid crystal material 130 along the direction 130.

The spacer 120 can be made of silica micro particles, and defines the distance between the high reflectivity layers 320, 325. In the present invention, as discussed in detail below, the distance between the high reflectivity layers 320, 325 is kept below 20 µm.

In some embodiments, the upper surface of the upper substrate 110 is coated with a band-pass filter layer 350; the lower surface of the lower substrate 115 is coated with an anti-reflectivity layer 360. Alternatively, the upper surface of the upper substrate 110 is coated with an anti-reflectivity layer; and the lower surface of the lower substrate 115 is coated with a band-pass filter layer.

Figure 4:
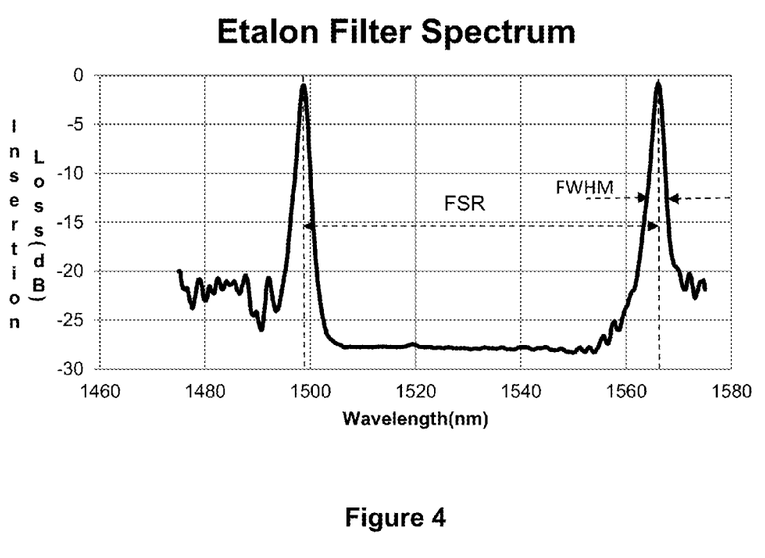
FIG. 4 shows an exemplified etalon filter spectrum in the etalon cavity in the hybrid tunable filter shown in FIG. 3.

In the hybrid tunable filter 300, the etalon cavity 380 is defined by the spatial region between the two high reflectivity layers 320, 325 (which is defined by the spacer 120) and in the gasket enclosed area 122 (FIG. 2). The interference of the light beam between the two high reflectivity layers 320, 325 produces an etalon filter spectrum in the etalon cavity 380 as shown in FIG. 4. The etalon filter spectrum includes a series of periodic spectral peaks that are separated by a free spectral range (FSR). Each of the spectral peaks is characterized by a full width at half magnitude (FWHM). The free spectral range is expressed by the following equation:

$$FSR = \frac{\lambda^2}{2nd} \quad (1)$$

in which d is the thickness between the two high reflectivity layers; n is the refractive index of the liquid crystal, and λ, is wavelength of the light in the etalon cavity 380.

In one example of the disclosed the hybrid tunable filter, n=1.75, d=10 FSR=68.6 nm, which covers the C-band. The high reflectivity layers 320, 325 have a reflective coefficient R=93%, lower than the reflectivities in some conventional filter devices. The lower R has a lower insertion loss and gives more tolerance to errors in the parallel alignment of the upper substrate 110 and the lower substrate 115. FINESS=43.3. FWHM=1.58 nm which is suitable for 100 G space C-band tunable laser. It should be noted that the disclosed hybrid tunable filters are also suitable for L-band tunable lasers.

Figure 5:
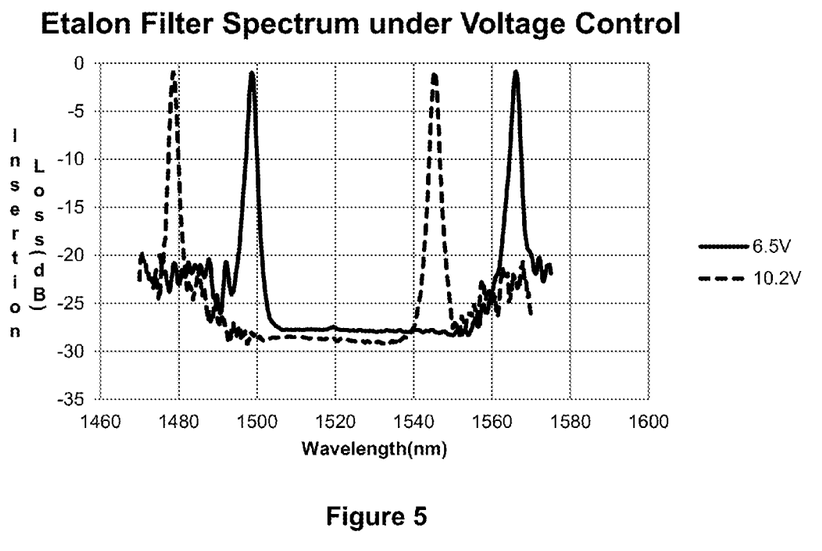
FIG. 5 shows exemplified tuning of the etalon filter spectrum by an electric voltage across the etalon cavity in the hybrid tunable filter shown in FIG. 3.

When an electric voltage (e.g. AC) is applied to across the electrode layers 140, 141, a voltage difference is produced between the conductive layers 310, 320, which in turn produces an electric filed to change the alignment of molecules in the liquid crystal material 130 and thus the refractive index of the liquid crystal material 130 in the etalon cavity 380. The degree of the alignment of the liquid crystal material 130 varies as a function of the voltage is applied to across the electrode layers 140, 141. The change in the refractive index in the etalon cavity 380 changes the spectral positions as well the FSR between the spectral peaks. FIG. 5 shows the shift of the etalon filter spectra in response to different electrical voltages (6.5 V and 10.2 V) across the electrical layers 140, 141.

Figure 6:
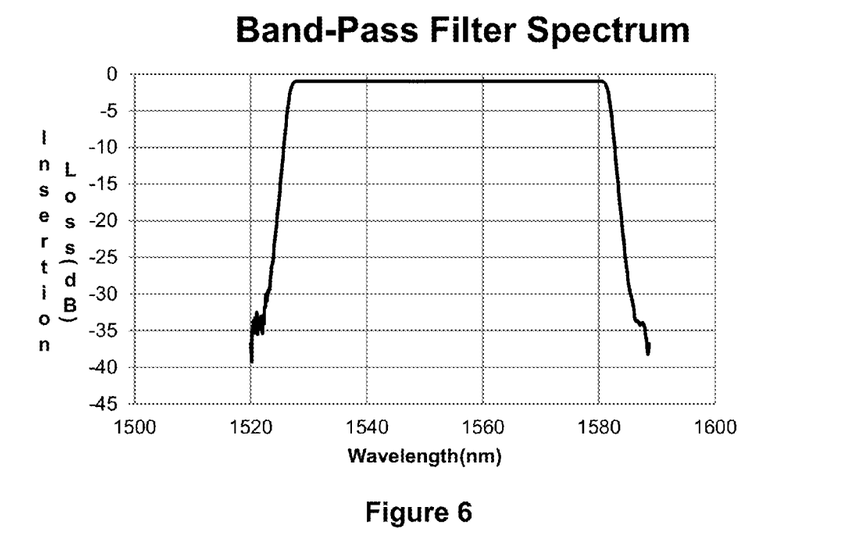
FIG. 6 shows an exemplified band-pass filter spectrum of a band-pass filter in the hybrid tunable filter shown in FIG. 3.
Figure 7:
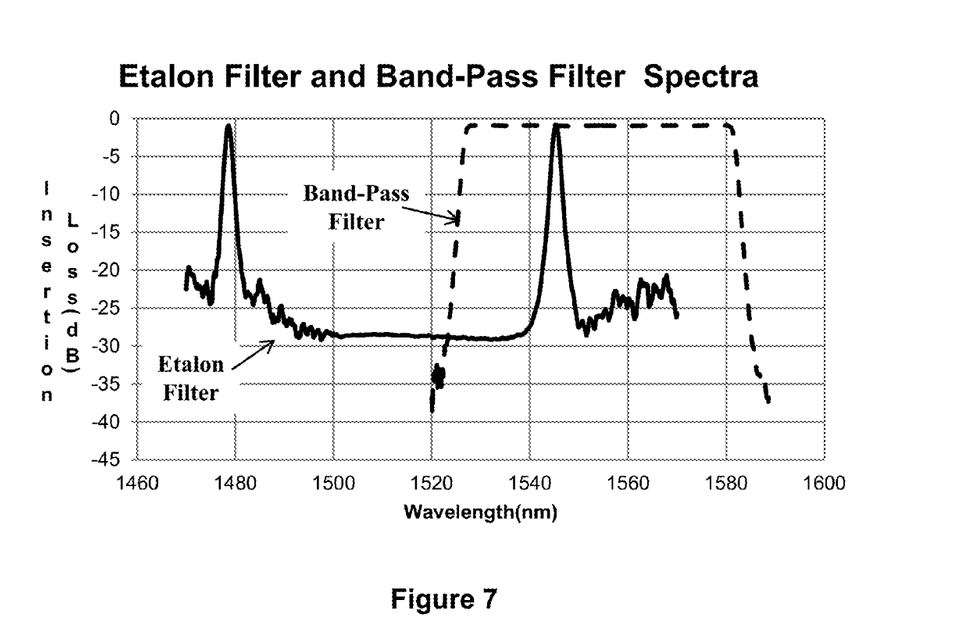

The band-pass filter layer 350 has a band-pass filter spectrum as shown in FIG. 6. A superposition of the spectra of the etalon filter (i.e. the etalon cavity 380 applied with a 10.2 V voltage in FIG. 5) and the band-pass filter layer (e.g. FIG. 6) is shown in FIG. 7. In the presently disclosed hybrid tunable filter, the band-pass filter layer 350 is configured such that its spectral band-pass width BPW is smaller than FSR of the etalon cavity 380.

$$BPW<FSR. \quad (2)$$

In some cases, $$BPW<0.9 \, FSR. \quad (3)$$

Figure 8:
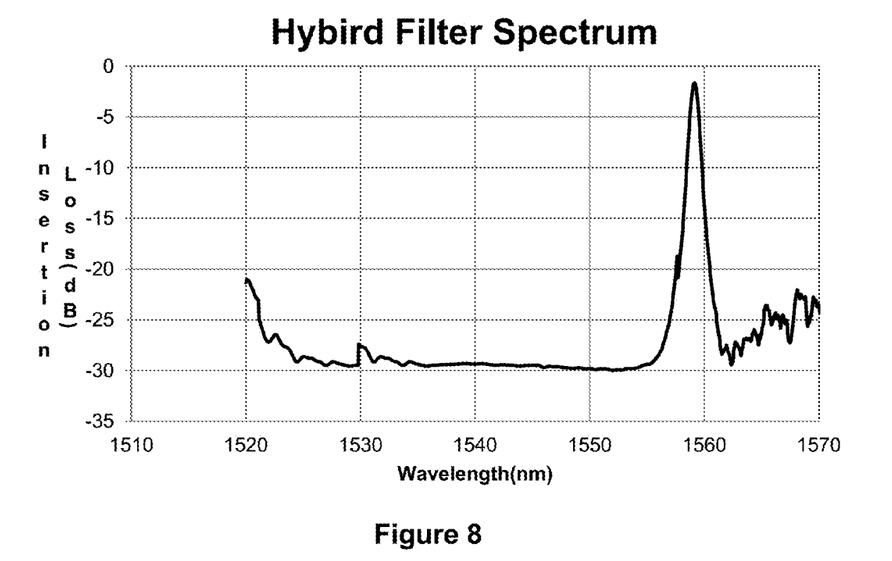
FIG. 8 shows exemplified spectrum of the output light comprising a single spectral peak from the hybrid tunable filter shown in FIG. 3.

As a result, as shown in FIG. 8, only one of the spectral peaks from the etalon cavity 380 is allowed to pass the band-pass filter layer 350 as the light outputs from the hybrid tunable filter 300. Other spectral peaks in the etalon cavity 380 are suppressed by the band-pass filter layer 350.

To ensure FSR to be larger than BPW and because FSR is inversely proportional to d, the distance (as defined by the spacer 120) between the high reflectivity layers 320, 325, or the height of the spacer 120, is kept below 20 µm, such as in range between 2 µm and 20 µm. In some embodiments, the distance between the high reflectivity layers 320, 325 (defined by the height of the spacer 120) is kept below 15 µm.

For a fixed band-pass filter (layer), the band-pass range and BPW are fixed, which define the tuning range for the spectral peak of the output light. The BPW of band-pass filter (layer) covers the C-band or the L-band used in the optical communications. In some embodiments, $$BPW>0.5FSR. \quad (4)$$

In some cases, $$BPW>0.7 \, FSR. \quad (5)$$

One advantage of the presently hybrid tunable filters is that it has a much smaller insertion loss compared to conventional devices. The light travel paths in the liquid crystal material in the etalon cavity in the disclosed hybrid tunable filters are significantly shorter than conventional devices, which reduces light absorption by the liquid crystal materials.

Figure 9:
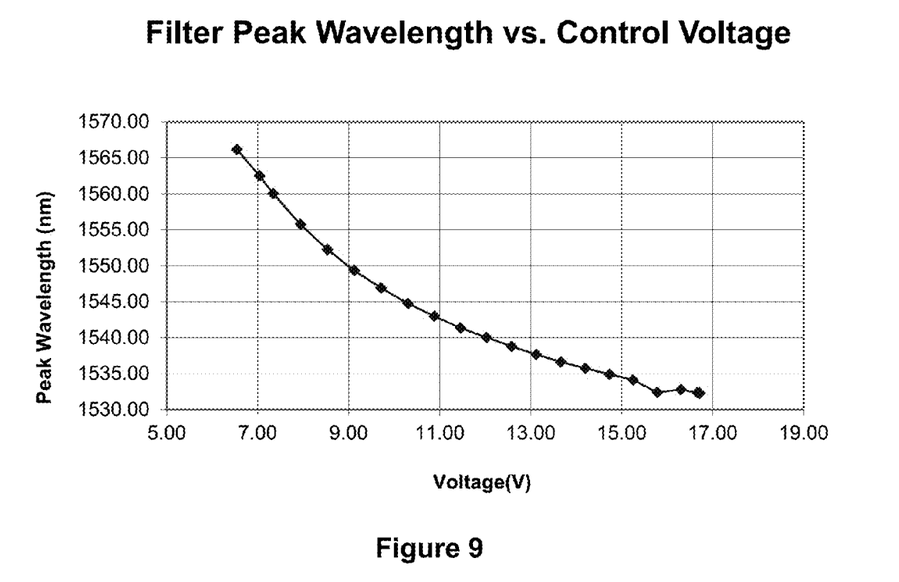
FIG. 9 shows the tuning curve of the peak wavelength of the output spectral peak as a function of control voltage in the hybrid tunable filter in accordance with the present invention.

The spectrum of the output light from the hybrid tunable filter 300 can be easily tuned by varying the voltage applied across the electrical layers 140, 141. FIG. 9 shows the spectral position of the single spectral peak of the output light as a function of the applied voltage (i e tuning curve). In contrast to some conventional system, the tuning curve is smooth and does not include sharp slopes (that prevents accurate voltage control).

Figure 10:
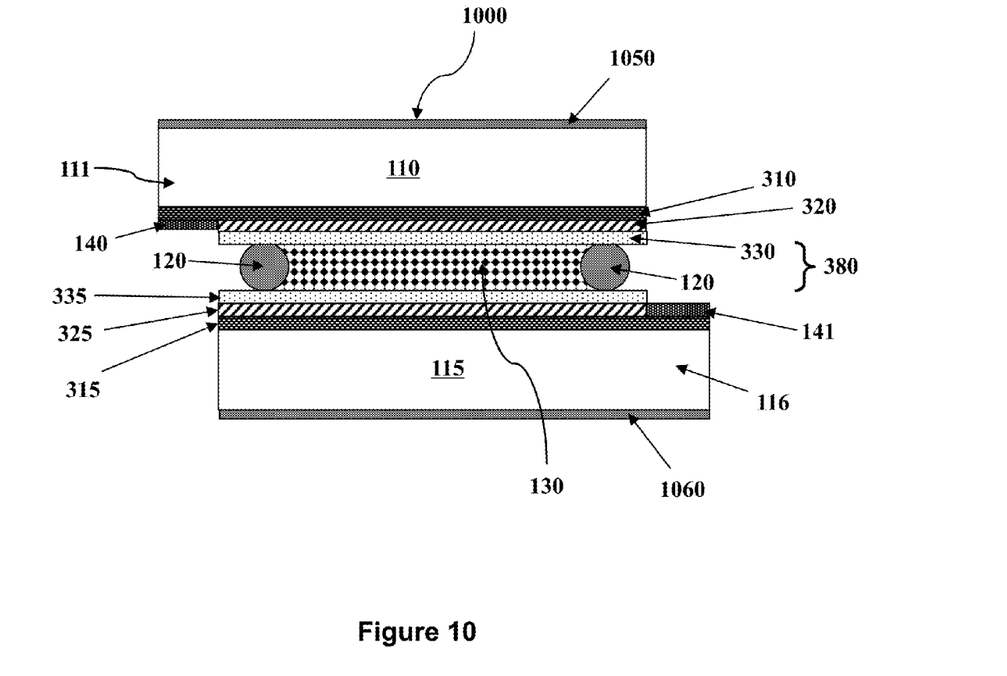
FIG. 10 is a detailed cross-sectional view of a hybrid tunable filter in accordance with another embodiment of the present invention.
Figure 11:
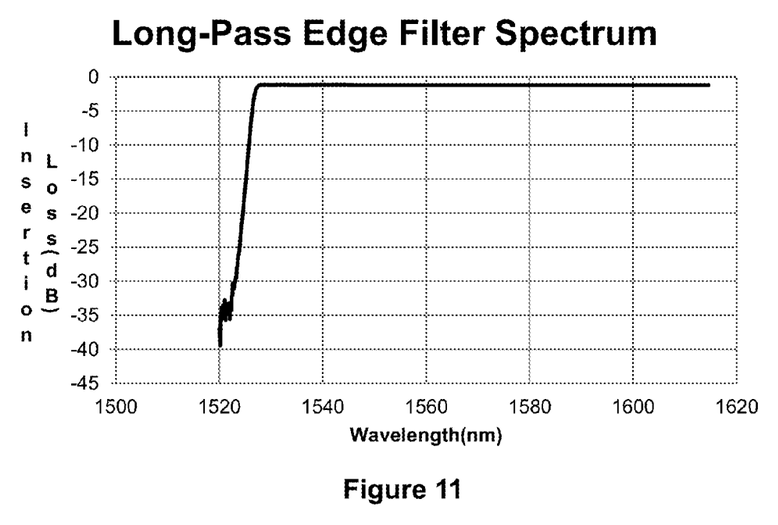
FIGS. 11 and 12 respectively show exemplified long-pass filter spectrum and short-pass filter spectrum of the long-pass filter and the short-pass filter in the hybrid tunable filter shown in FIG. 10.
Figure 12:
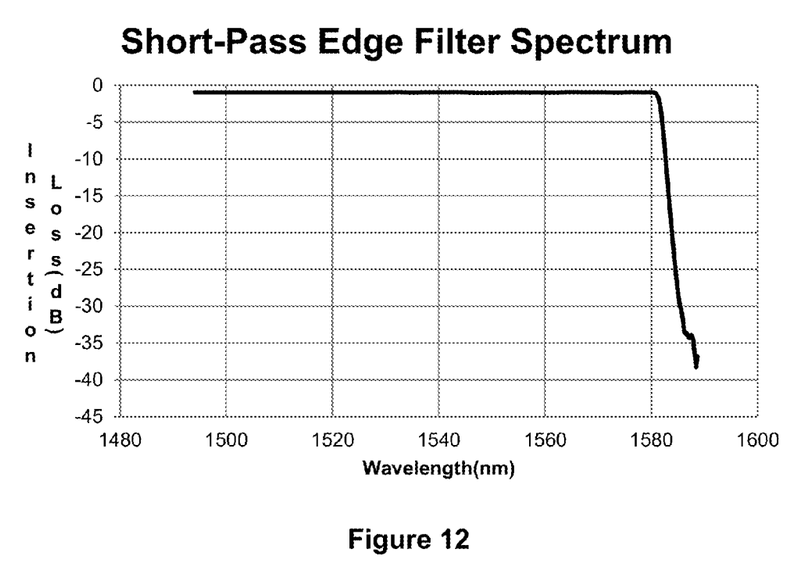
Figure 13:
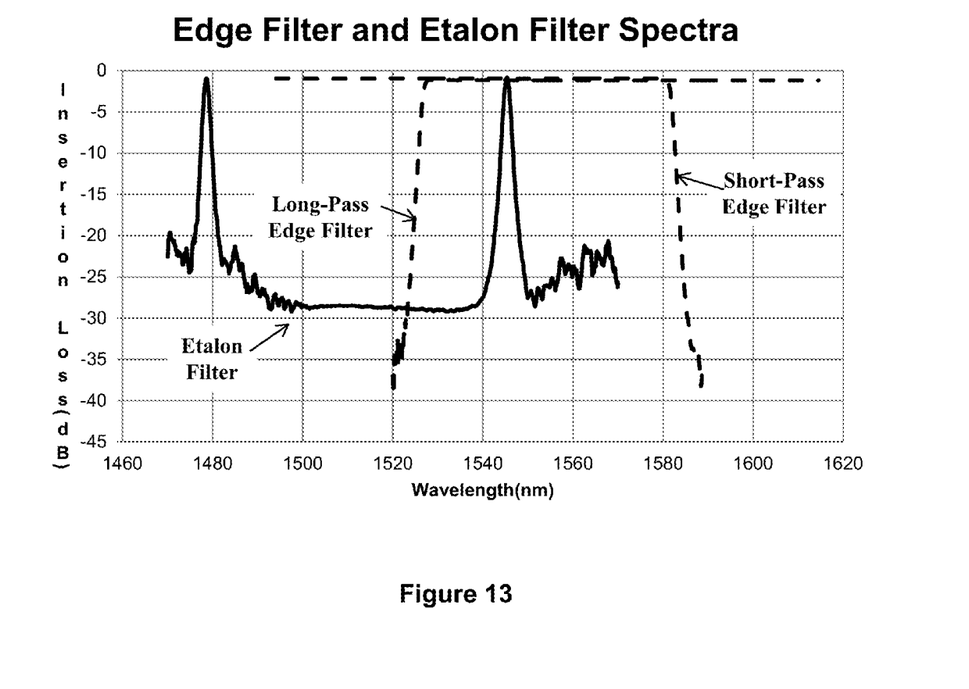
FIG. 13 shows the superposition of the etalon filter spectra and the two edge filters in the hybrid tunable filter shown in FIG. 10.

In some embodiments, the above described performance of the hybrid tunable filter 300 can be accomplished by other filter configurations in accordance with the present invention. Referring to FIG. 10, a hybrid tunable filter 1000 includes components similar to those described above in relation to the hybrid tunable filter 300 (FIG. 3). Instead of the band-pass filter layer and the anti-reflectivity layer, edge filter layers 1050, 1060 are respectively coated on the upper surface of the upper substrate 110 and the lower surface of the lower substrate 115. One of the edge filter layers 1050, 1060 is a short-pass edge filter, and another being a long-pass edge filter, with their filter spectra respectively shown in FIGS. 11 and 12. The pass bands of the two edge filter layers 1050, 1060 overlap, which in combination produces a band-pass spectrum characterized by a band-pass width BPW (FIG. 13), similar to the band-pass filter spectrum shown in FIG. 6 (of the band-pass filter layer 350 in FIG. 3). Similar to the requirements above for the band-pass filter layer 350 (FIG. 3), the combined band-pass spectrum, as shown in FIG. 13, has a spectral band-pass width smaller than FSR of the etalon cavity 380 (i.e. etalon filter) in the hybrid tunable filter 1000, which assures a single spectral peak in the output light.

Figure 14:
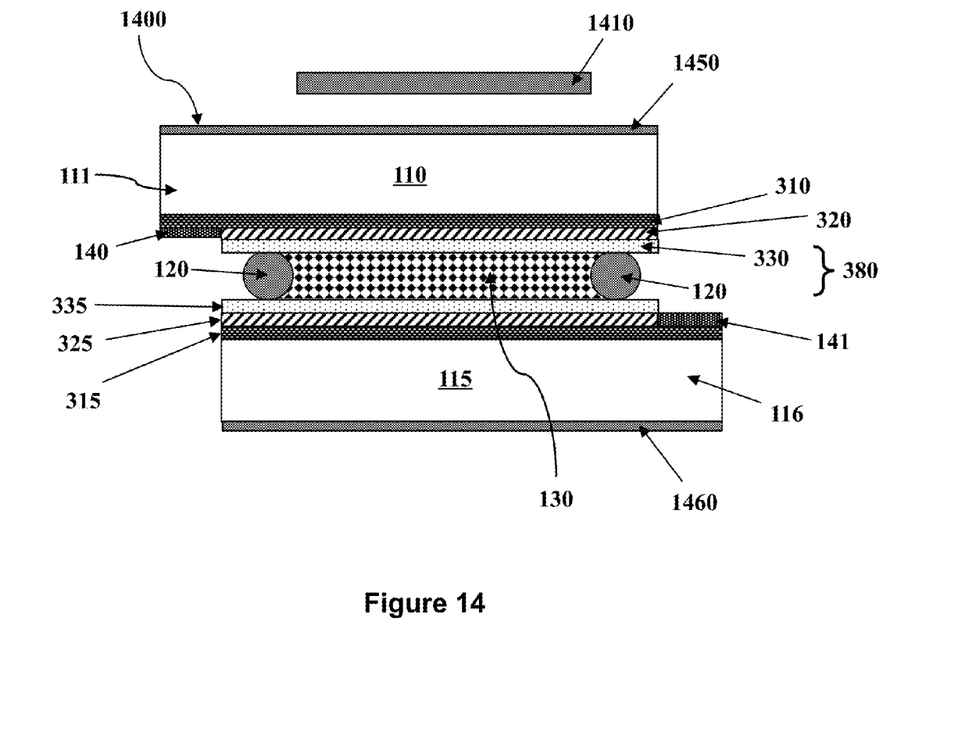
FIG. 14 is a detailed cross-sectional view of a hybrid tunable filter in accordance with yet another embodiment of the present invention.

In some embodiments, referring to FIG. 14, a hybrid tunable filter 1400 includes components similar to those described above in relation to the hybrid tunable filter 300 (FIG. 3). Instead of the band-pass filter layer and the anti-reflectivity layer, both the upper surface of the upper substrate 110 and the lower surface of the lower substrate 1150 are respectively coated by anti-reflectivity layer 1450, 1460. A separate band-pass filter 1410 provides the same band-pass spectrum as that of the band-pass filter layer 350 (FIGS. 3, 6) as described above. Similar to the band-pass filter layer 350 (FIG. 3) and the edge filter layers 1050, 1060 (FIG. 10), the band-pass filter 1410 has a spectral band-pass width smaller than FSR of the etalon cavity 380 in the hybrid tunable filter 1400, which assures a single spectral peak in the output light.

Figures 15, 16:
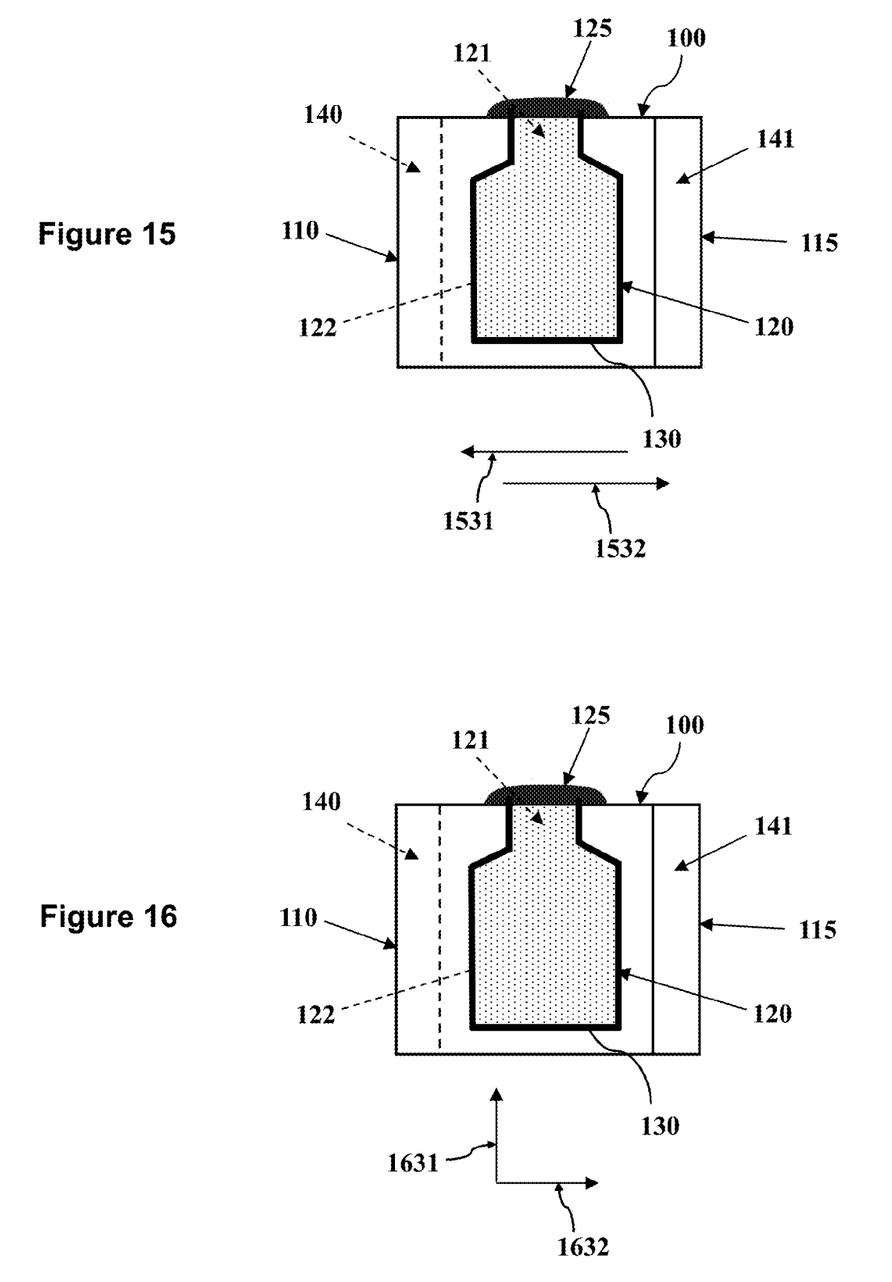
FIGS. 15-16 are top views of the hybrid tunable filters having different alignment directions for the liquid crystal material in the cavity in accordance with the present invention.

In some embodiments, the liquid crystal materials in the etalon cavity can be aligned in different directions with different boundary conditions. Referring to FIGS. 3 and 15, the buffed polymer layers 330, 335 can be polished in opposite directions 1531, 1532 instead of the same direction. In some embodiments, referring to FIGS. 3 and 13, the buffed polymer layers 330, 335 can be polished in orthogonal directions 1631, 1632, which can enable a twisted nematic liquid crystalline state in the etalon cavity 380. It should be noted that the presently described hybrid tunable filters are compatible with other polishing directions at the upper and lower boundary of the liquid crystal materials.

Only a few examples and implementations are described. Other implementations, variations, modifications and enhancements to the described examples and implementations may be made without deviating from the spirit of the present invention. For example, the materials for the parallel upper and lower substrates, the spacer, the polymer buffed layers, and the conductive layers can be different from the examples described above while still being compatible with the disclosed invention. In some cases, the band-pass filter can be bonded with or attached to the etalon tunable filter to form a hybrid tunable filter. The disclosed hybrid tunable filters are compatible with spectral ranges for the etalon cavity and the band-pass filter (layer) other than the examples described above. The disclosed hybrid tunable filters can be applicable to tunable lasers in wavelength range other than the examples described above.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

It will thus be seen that the objects of the present invention have been fully and effectively accomplished. Its embodiments have been shown and described for the purpose of illustrating the functional and structural principles of the present invention and is subject to change without departure from such principles. Therefore, this invention includes all modifications encompassed within the spirit and scope of the following claims.

What is claimed is:

1. A hybrid tunable filter, comprising:
an upper substrate comprising an upper lip;
a lower substrate comprising a lower lip and being substantially parallel to the upper substrate, wherein the upper substrate and the lower substrate are offset from each other to allow the upper lip to hang over the lower substrate and the lower lip to protrude outside of the upper substrate;
a first conductive layer coated on a lower surface of the upper substrate;
a second conductive layer coated on an upper surface of the lower substrate;
a first high reflectivity layer formed on a portion of the first conductive layer;
a first electrode layer formed on a portion of the first conductive layer under the upper lip;
a second high reflectivity layer formed on a portion of the second conductive layer;
a second electrode layer formed on a portion of the second conductive layer above the lower lip;
a spacer sandwiched between the upper substrate and the lower substrate, wherein the spacer is elongated and is arranged to form a loop defining a gasket enclosed area;
a liquid crystal material configured to fill the gasket enclosed area, wherein the first high reflectivity and the second high reflectivity layer define an etalon cavity in the gasket enclosed area which transmits light characterized by multiple spectral peaks, wherein the multiple spectral peaks of the light in the etalon cavity are separated by a free spectral range FSR; and
a band-pass filter layer formed on one of the upper surface of the upper substrate or the lower surface of the lower substrate, wherein the band-pass filter layer has a single pass band, wherein the band-pass filter layer is characterized by a band-pass width BPW larger than 0.5 FSR and is configured to pass the light in one of multiple spectral peaks from the etalon cavity, thereby producing an output light having a single spectral peak.

2. The hybrid tunable filter of claim 1, wherein the single spectral peak of the output light is configured to be tuned within the BPW of the band-pass filter layer by an electric voltage applied across the first electrode layer and the second electrode layer.

3. The hybrid tunable filter of claim 1, wherein the etalon cavity is configured such that BPW is smaller than FSR.

4. The hybrid tunable filter of claim 3, wherein the etalon cavity is configured such that BPW is smaller than 0.9 FSR.

5. The hybrid tunable filter of claim 1, wherein the etalon cavity is configured such that BPW is larger than 0.7 FSR.

6. The hybrid tunable filter of claim 1, wherein the spacer defines a distance between the first high reflectivity layer and the second high reflectivity layer smaller than and 20 μm.

7. The hybrid tunable filter of claim 6, wherein the distance between the first high reflectivity layer and the second high reflectivity layer is smaller than and 15 μm.

8. The hybrid tunable filter of claim 6, wherein the distance between the first high reflectivity layer and the second high reflectivity layer is between 2 μm and 20 μm.

9. The hybrid tunable filter of claim 1, further comprising:
an anti-reflectivity layer formed on another one of the upper surface of the upper substrate or the lower surface of the lower substrate.

10. The hybrid tunable filter of claim 1, further comprising:
a first buffed polymer layer formed on the first high reflectivity layer; and
a second buffed polymer layer formed on the second high reflectivity layer, wherein the first buffed polymer layer and the second buffed polymer layer are configured to align the liquid crystal material.

11. The hybrid tunable filter of claim 10, wherein the first buffed polymer layer and the second buffed polymer layer are configured to respectively align the liquid crystal material in a same direction or opposition directions.

12. The hybrid tunable filter of claim 10, wherein the first buffed polymer layer and the second buffed polymer layer are configured to respectively align the liquid crystal material in orthogonal directions.

13. The hybrid tunable filter of claim 10, wherein the upper substrate and the lower substrate are substantially transparent to the output light.

14. The hybrid tunable filter of claim 1, wherein the loop has an opening, the hybrid tunable filter further comprising:
a sealing material configured to seal the opening in the loop thereby enclosing the liquid crystal material in the gasket enclosed area.

15. A hybrid tunable filter, comprising:
an upper substrate comprising an upper lip;
a lower substrate comprising a lower lip and being substantially parallel to the upper substrate, wherein the upper substrate and the lower substrate are offset from each other to allow the upper lip to hang over the lower substrate and the lower lip to protrude outside of the upper substrate;
a first conductive layer coated on a lower surface of the upper substrate;
a second conductive layer coated on an upper surface of the lower substrate;
a first high reflectivity layer formed on a portion of the first conductive layer;
a first electrode layer formed on a portion of the first conductive layer under the upper lip;
a second high reflectivity layer formed on a portion of the second conductive layer;
a second electrode layer formed on a portion of the second conductive layer above the lower lip;
a spacer sandwiched between the upper substrate and the lower substrate, wherein the spacer is elongated and is arranged to form a loop defining a gasket enclosed area;
a liquid crystal material configured to fill the gasket enclosed area, wherein the first high reflectivity and the second high reflectivity layer define an etalon cavity in the gasket enclosed area which transmits light characterized by multiple spectral peaks, wherein the multiple spectral peaks of the light in the etalon cavity are separated by a free spectral range FSR; and
a band-pass filter characterized by a band-pass width BPW larger than 0.5 FSR and configured to pass the light from the etalon cavity in one of multiple spectral peaks in the BPW, thereby producing an output light having a single spectral peak, wherein the band-pass filter comprises a long-pass edge filter and a short-pass edge filter that in combination define the band-pass width BPW.

16. The hybrid tunable filter of claim 15, wherein the etalon cavity is configured such that BPW is smaller than FSR.

17. The hybrid tunable filter of claim 15, wherein the band-pass filter is formed on one of the upper surface of the upper substrate or the lower surface of the lower substrate.

18. The hybrid tunable filter of claim 15, wherein the band-pass filter has a single pass band.

* * * * *